L. L. CRADDOCK & J. McCLEARY.
VALVE.
APPLICATION FILED MAY 20, 1907.
899,659.
Patented Sept. 29, 1908.
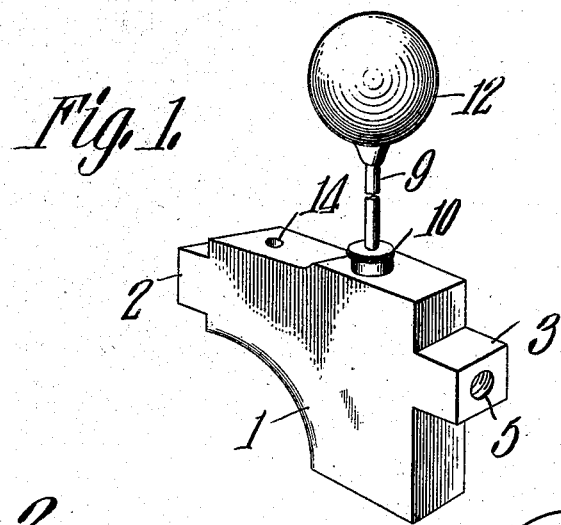
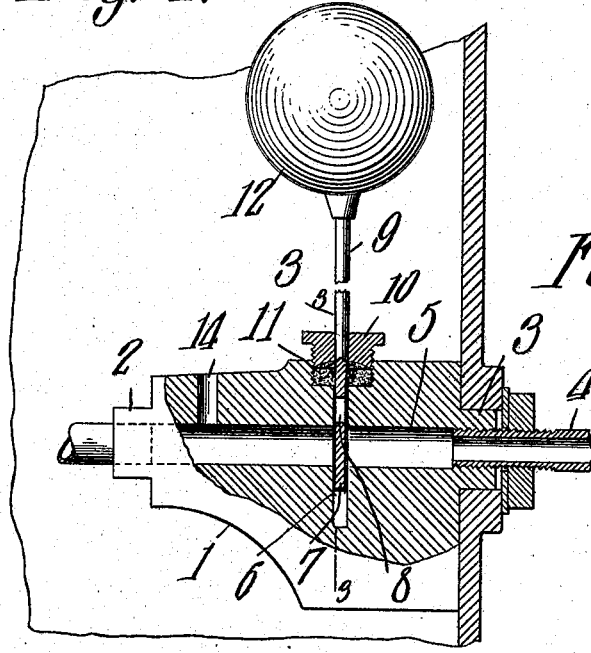
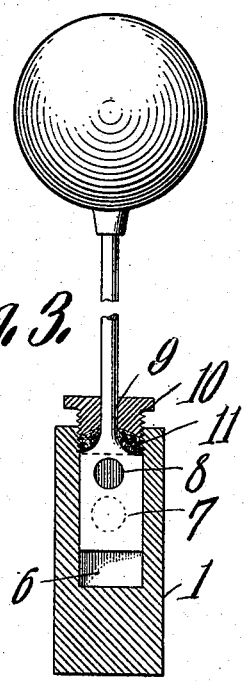
Lee Larrence Craddock
John McCleary,
Inventors
Witnesses
By C. A. Snow & Co
Attorneys

UNITED STATES PATENT OFFICE.

LEE LARRENCE CRADDOCK AND JOHN McCLEARY, OF SONORA, TEXAS.

VALVE.

No. 899,659.    Specification of Letters Patent.    Patented Sept. 29, 1908.

Application filed May 20, 1907. Serial No. 374,646.

*To all whom it may concern:*

Be it known that we, LEE LARRENCE CRADDOCK and JOHN McCLEARY, citizens of the United States, residing at Sonora, in the county of Sutton and State of Texas, have invented a new and useful Valve, of which the following is a specification.

This invention relates to improvements in valves for controlling the flow of fluids, and it has for its object to provide a device of this character that is very simple in construction and is capable of being readily applied to mains and tanks, and used in various other connections wherein it is desirable to regulate the flow of fluid, it being especially adapted for use as a float valve for controlling the flow of liquid into a tank, reservoir, or other receptacle, whereby the liquid may be maintained at any given height, the construction of the device being such that there are no delicate or projecting parts that might be readily broken.

To these and other ends, the invention comprises the various novel features of construction and combination and arrangement of parts, which will be hereinafter more fully described, and pointed out particularly in the claims appended hereto.

In the accompanying drawings:— Figure 1 is a perspective view of a valve constructed in accordance with the present invention. Fig. 2 is a view showing the valve applied to a tank or receptacle, portions of the valve being shown in section to illustrate its construction. Fig. 3 is a transverse section through the device and showing the valve proper in elevation.

Corresponding parts in the several figures are indicated throughout by similar characters of reference.

A valve embodying the present invention is adapted for use in various connections wherein it is desirable to control or regulate the flow of a fluid, the valve shown in the present embodiment of the invention being operated by a float whereby the level of a liquid within a tank or other receptacle may be automatically maintained at a given point.

The valve shown in the present instance comprises a casing 1 which may be formed in any desired way, an integral casting of brass, iron or other suitable material being preferably employed for this purpose. The opposite ends of the casting are provided with bosses 2 and 3 which are preferably threaded to receive the appropriate pipe connections, the boss 3 being attached to the pipe leading from the source of supply while the pipe leading from the valve is attached to the boss 2 and is designed to discharge the water into the tank. If so desired, these portions may be employed for supporting the valve in the tank or on any suitable support, the boss being fitted closely into a correspondingly formed aperture in the side of the tank and provided with suitable means for preventing leakage. In the present instance, the valve is shown applied to a tank, the boss 3 extending through one of the vertical walls thereof and having a supply pipe 4 connected thereto, the liquid discharging through the aperture in the boss 2.

Extending through the casing in alinement with the axes of the two bosses is a passage 5, and extending downwardly within the casing is a slot 6 which is substantially flat in cross section and is arranged transversely of the passage 5 and operating vertically in this slot is a valve 7 which, in the present instance, is of the gate type, comprising a plate closely fitting the walls of the slot and arranged to slide vertically therein, the plate being provided with an opening 8 arranged to register with the passage 5 when the valve is in its lowermost position and thus permit a flow of fluid through the valve. A solid or closed portion of the plate registers with the passage when the valve is in raised position, as shown in Fig. 3, the flow of fluid through the passage of the valve casing being interrupted. The valve is provided with an operating stem 9 which preferably operates through a stuffing box gland 10 which is threaded into an opening 11 formed in the top of the valve casing. Any suitable means may be employed for actuating the valve, a handle being attached to the valve stem when it is desirable to manipulate the valve manually, a float 12 being shown directly attached to the valve stem in the present instance in order that the valve will operate automatically to control or regulate the flow of liquid to the tank. The float may be of any suitable construction possessing the requisite buoyancy, a hollow metallic ball of sheet metal being employed usually for such purposes, the float being arranged on the level at which it is desired to interrupt the flow of the liquid.

It is preferable to provide a supplemental leak opening 14 which extends at an angle to the passage 5, whereby the liquid from the valve may be discharged from the supplemental opening into a tank while a second discharge is taking place from the pipe threaded into the boss 2.

A valve constructed in accordance with the present invention is so simple in construction that it may be manufactured and sold cheaply, and it obviates the use of levers or other projecting parts that are liable to become broken, especially when the valve is employed out of doors where it is liable to become trampled upon.

What is claimed is:—

The combination with a tank having an opening therein, of a valve casing comprising a block formed in a single piece of material and having an integral boss projecting into and engaging the wall of the opening to support said casing in the tank, there being a passage extending through the boss and the block and having a leak aperture opening therein and into the tank, said block also having an angular recess extending thereinto from its upper face and transversely of and below the passage, said recess being permanently closed except at its upper end, a slide valve mounted to reciprocate within the recess and having an opening designed, when the valve is lowered, to register with and open the passage, a stem extending from the slide valve and rigid therewith, a float secured to and rigid with the stem, and packing arranged about the stem and adjacent the open end of the recess to prevent leakage past the stem from the recess.

In testimony that we claim the foregoing as our own, we have hereto affixed our signatures in the presence of two witnesses.

LEE LARRENCE CRADDOCK.
JOHN McCLEARY.

Witnesses:
D. B. CUSENBURY,
E. S. BRIANT.